F. F. LANDIS.
MACHINE FOR MOLDING CONCRETE.
APPLICATION FILED SEPT. 10, 1906.

1,017,876.

Patented Feb. 20, 1912.
9 SHEETS—SHEET 1.

F. F. LANDIS.
MACHINE FOR MOLDING CONCRETE.
APPLICATION FILED SEPT. 10, 1906.

1,017,876.

Patented Feb. 20, 1912.

9 SHEETS—SHEET 2.

F. F. LANDIS.
MACHINE FOR MOLDING CONCRETE.
APPLICATION FILED SEPT. 10, 1906.

1,017,876.

Patented Feb. 20, 1912.
9 SHEETS—SHEET 7.

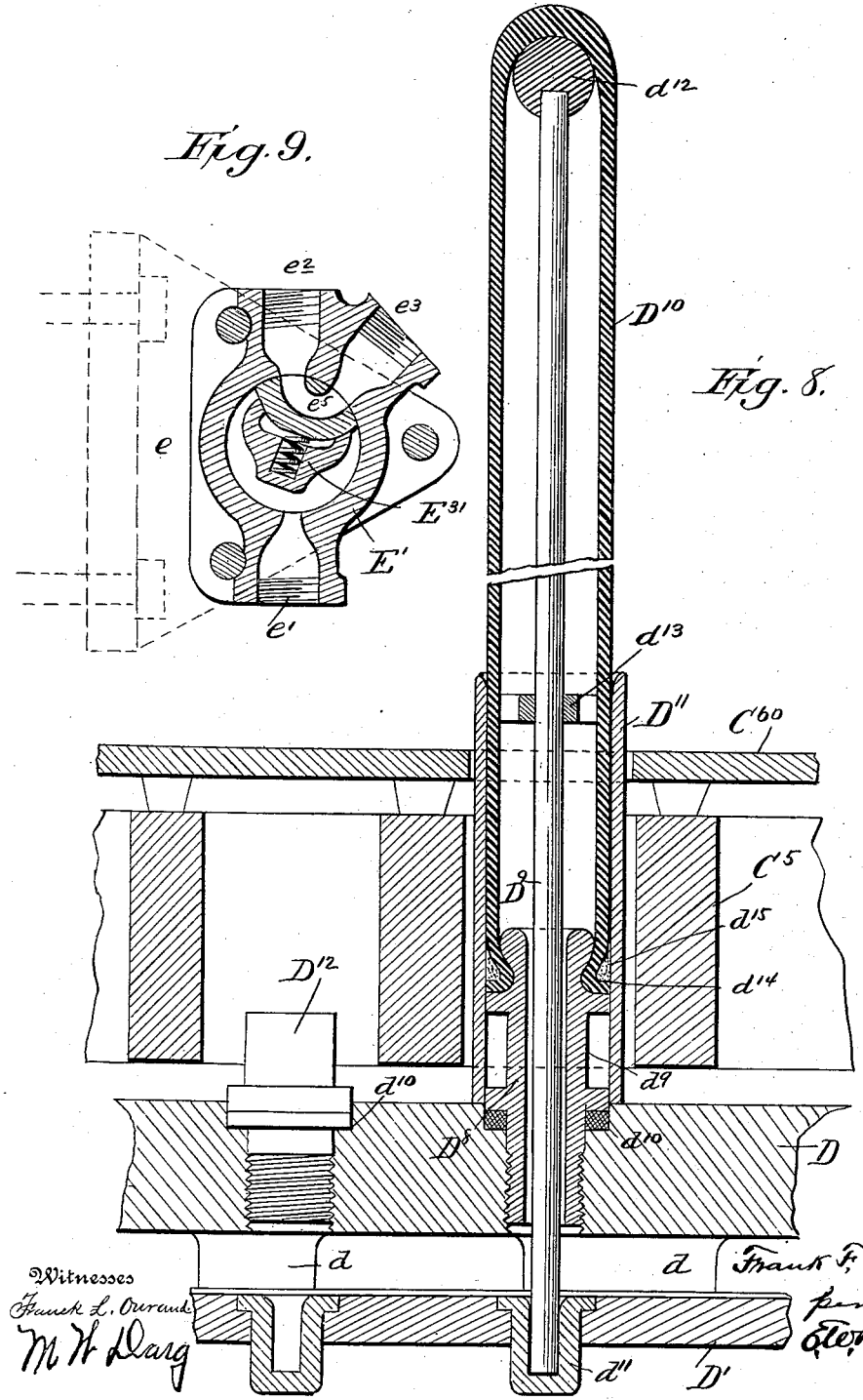

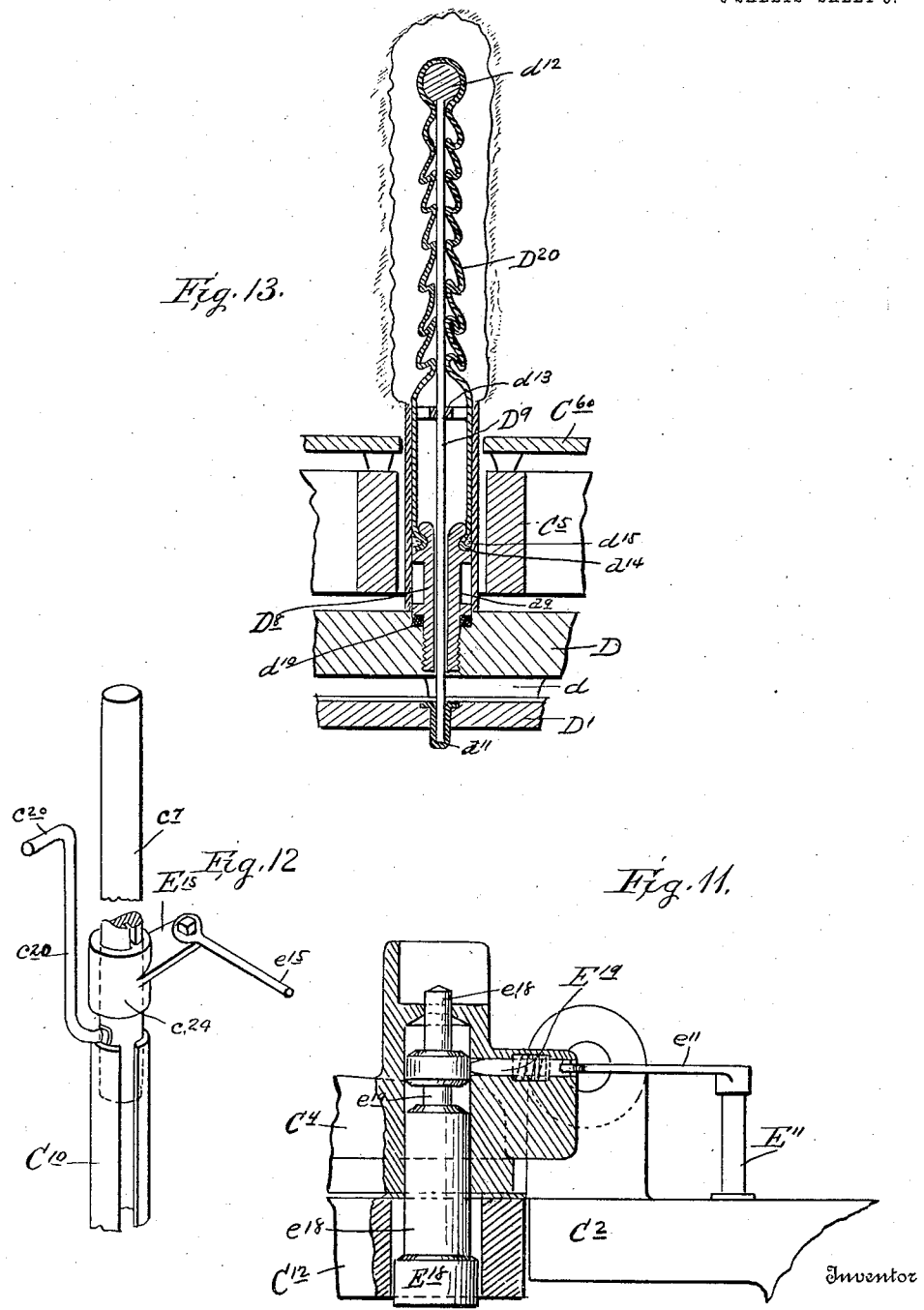

UNITED STATES PATENT OFFICE.

FRANK F. LANDIS, OF WAYNESBORO, PENNSYLVANIA.

MACHINE FOR MOLDING CONCRETE.

1,017,876.   Specification of Letters Patent.   Patented Feb. 20, 1912.

Application filed September 10, 1906. Serial No. 333,957.

*To all whom it may concern:*

Be it known that I, FRANK F. LANDIS, a citizen of the United States, residing at Waynesboro, in the county of Franklin and State of Pennsylvania, have invented certain new and useful Improvements in Machines for Molding Concrete, of which the following is a specification.

The object of my invention is to provide a machine for molding and compressing concrete, or like material, into a predetermined form within a mold, after said mold is entirely filled and closed, the inside thereof being of the exact dimensions and form the article composed of said material is to have when finished, such as all dimensions and forms of building blocks.

Said invention also provides means whereby an internal fluid pressure is quickly and uniformly exerted within and in all directions upon all the material in said mold from within the body of said material, thereby compressing it without changing the form or dimensions of the mold or the outside form of the building block or other product, from that which it had before being subjected to pressure.

It also provides means by which such mold can be opened and closed with ease and rapidity by utilizing the weight of the machine itself to counterbalance the gravity of the moving parts of the mold.

It further provides a combination of devices which automatically prevent the possibility of pressure being exerted upon material within a mold previous to having the mold entirely filled, closed and all movable parts adjusted and properly secured one to the other ready to receive internally a pressure in all directions, all as will be hereinafter more fully described and claimed.

Figure 1:
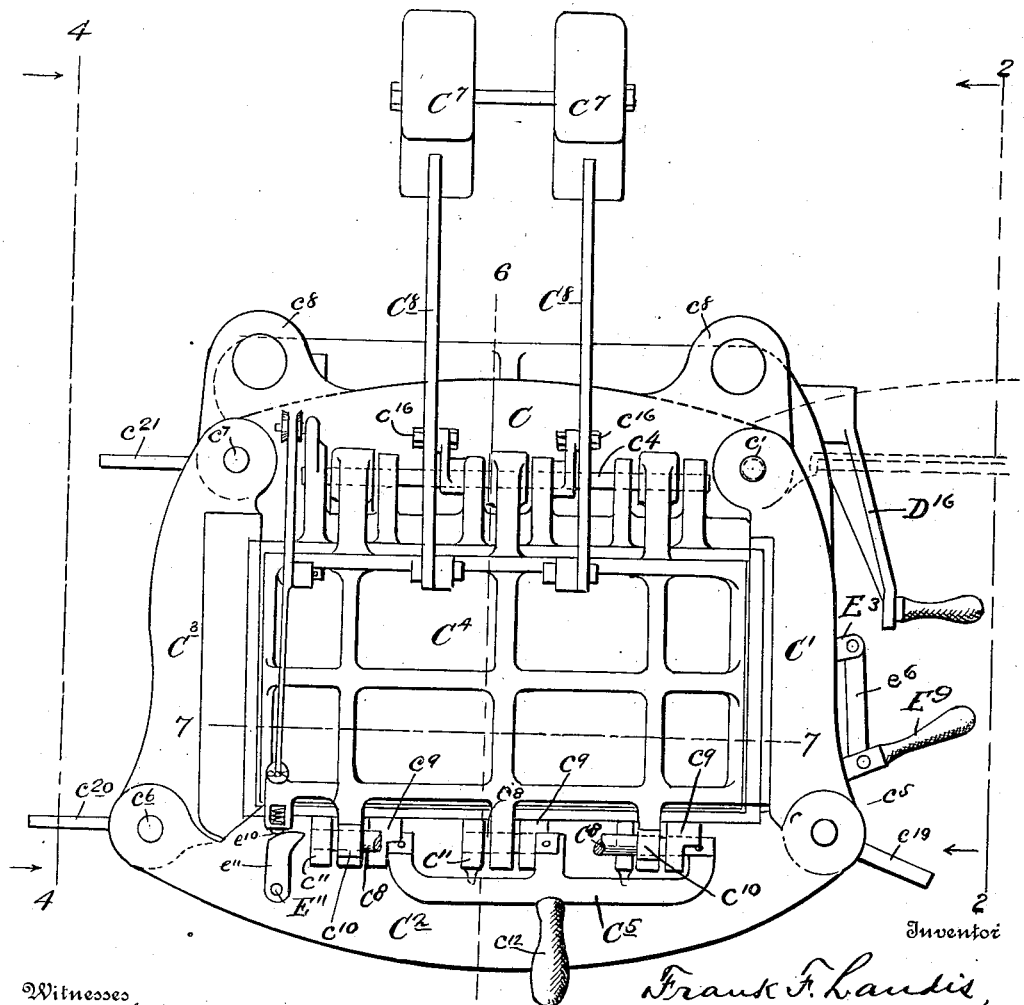
Figure 2:
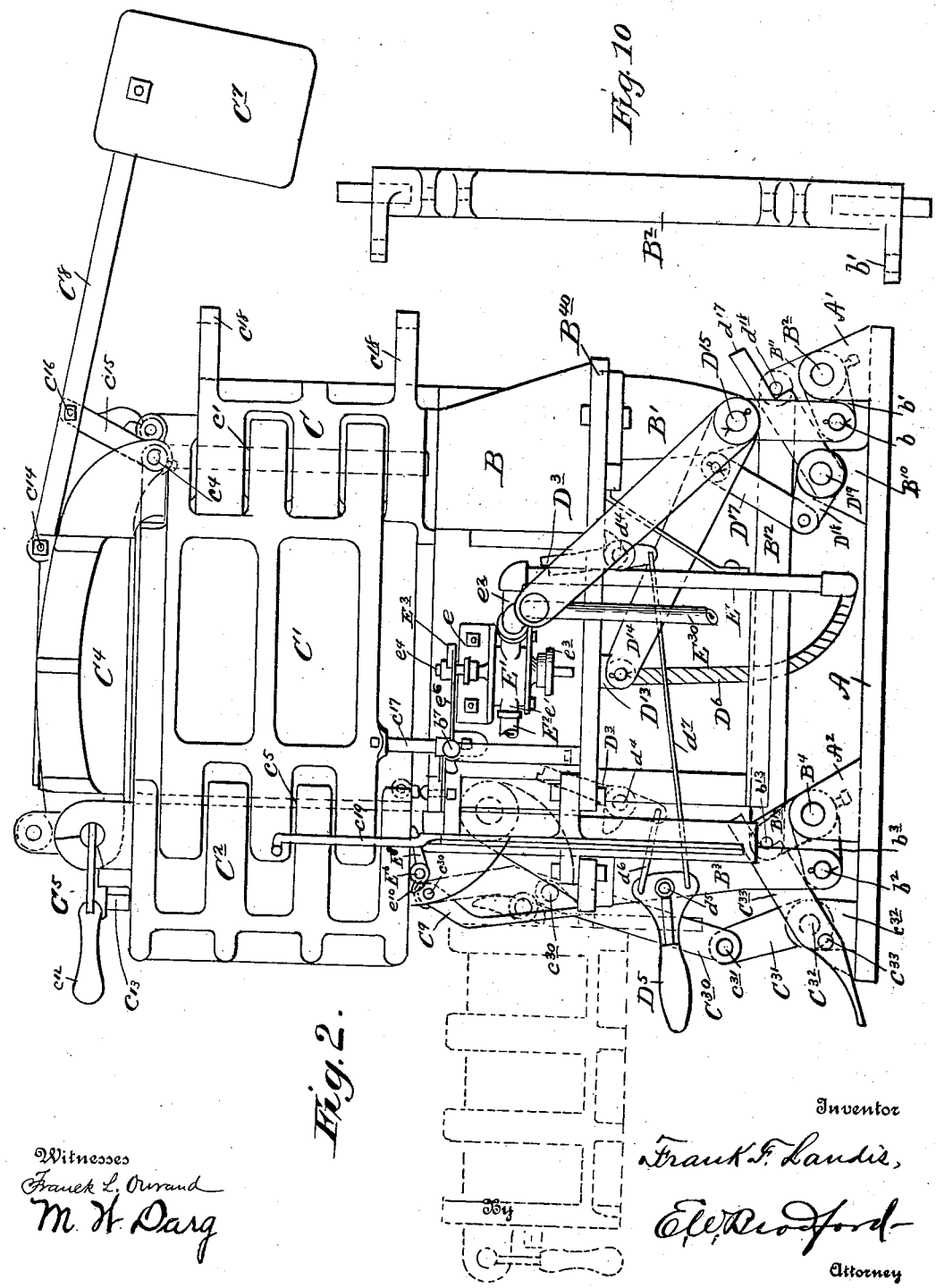
Figure 3:
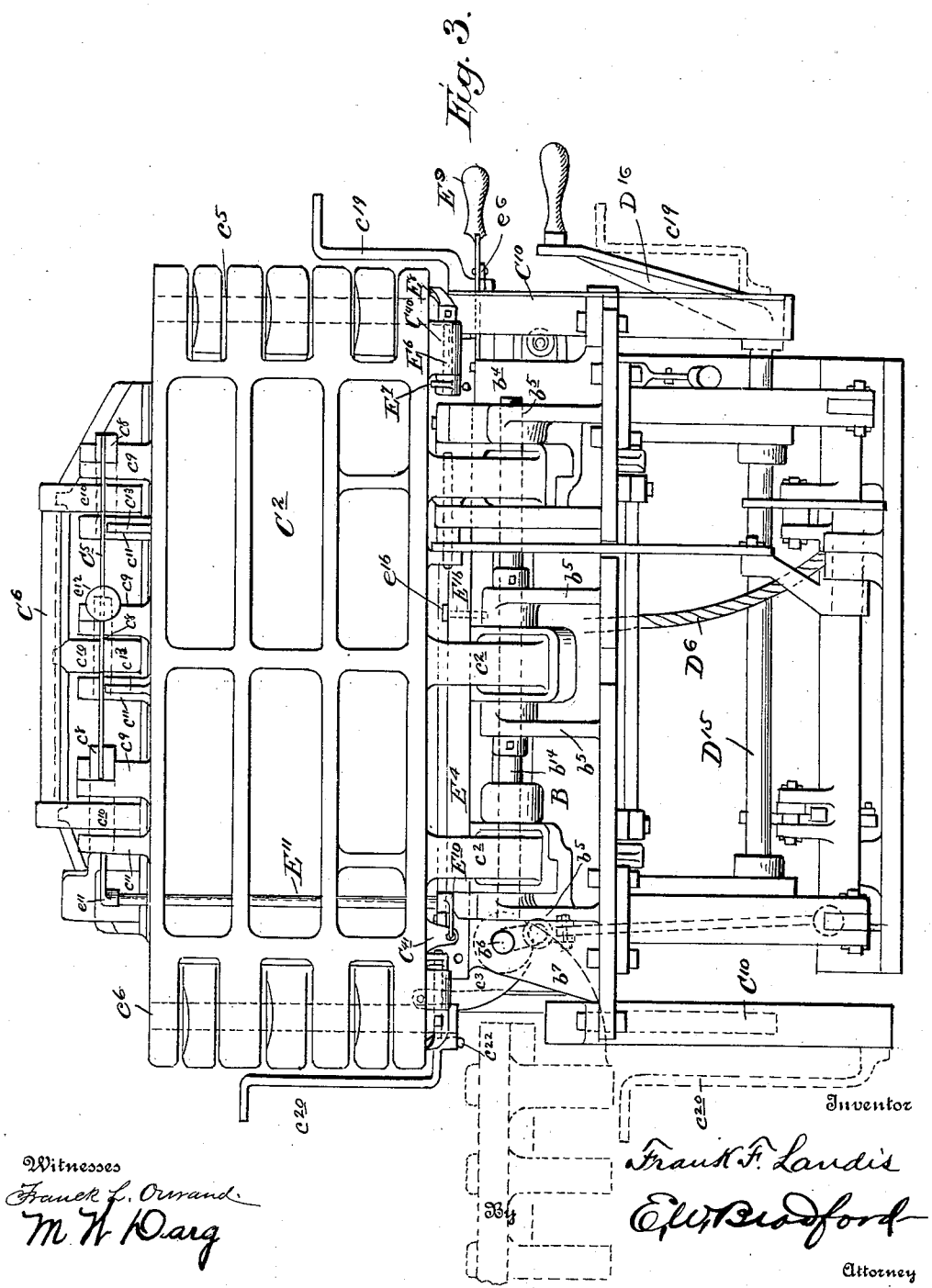
Figure 4:
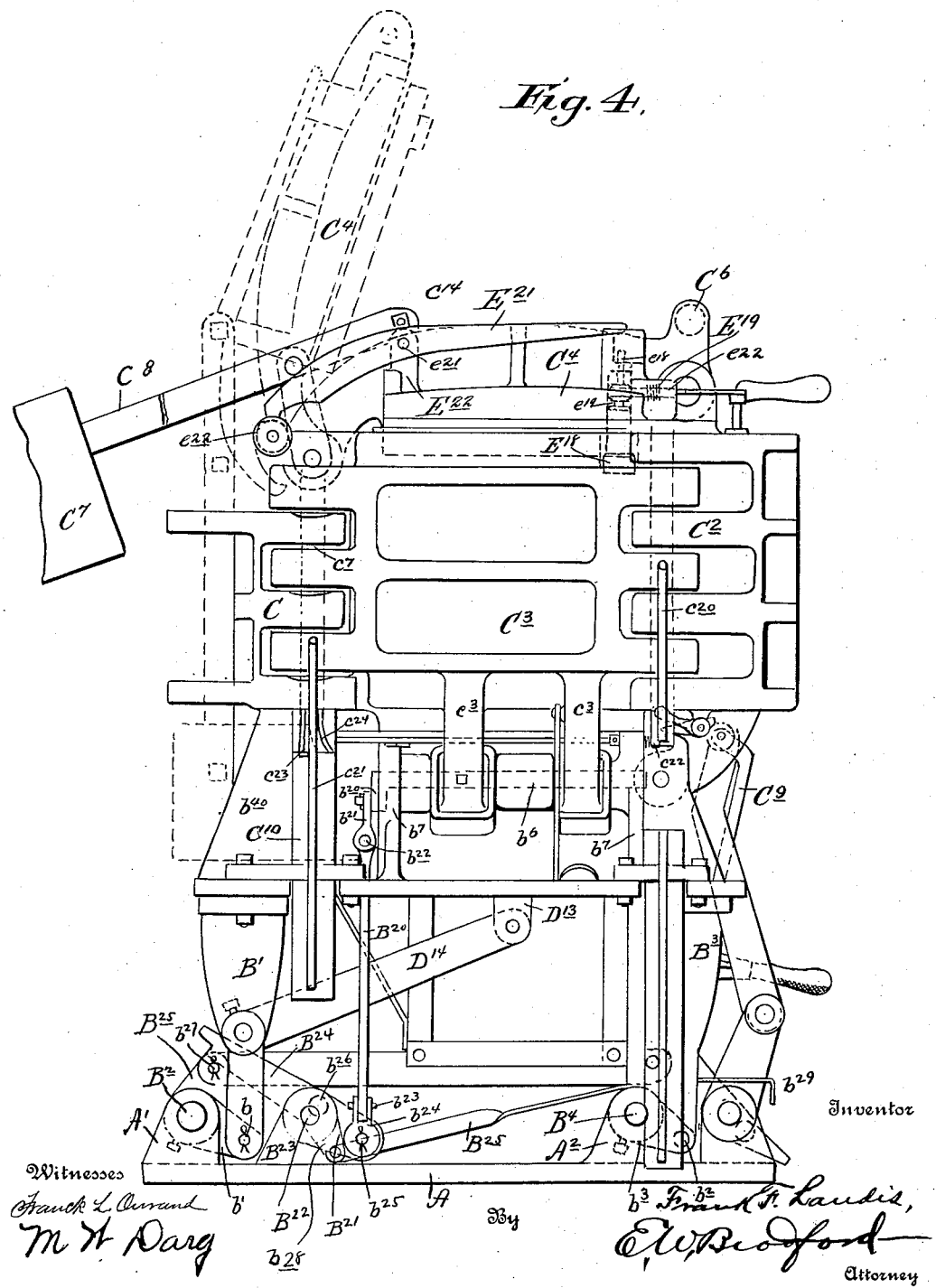
Figure 5:
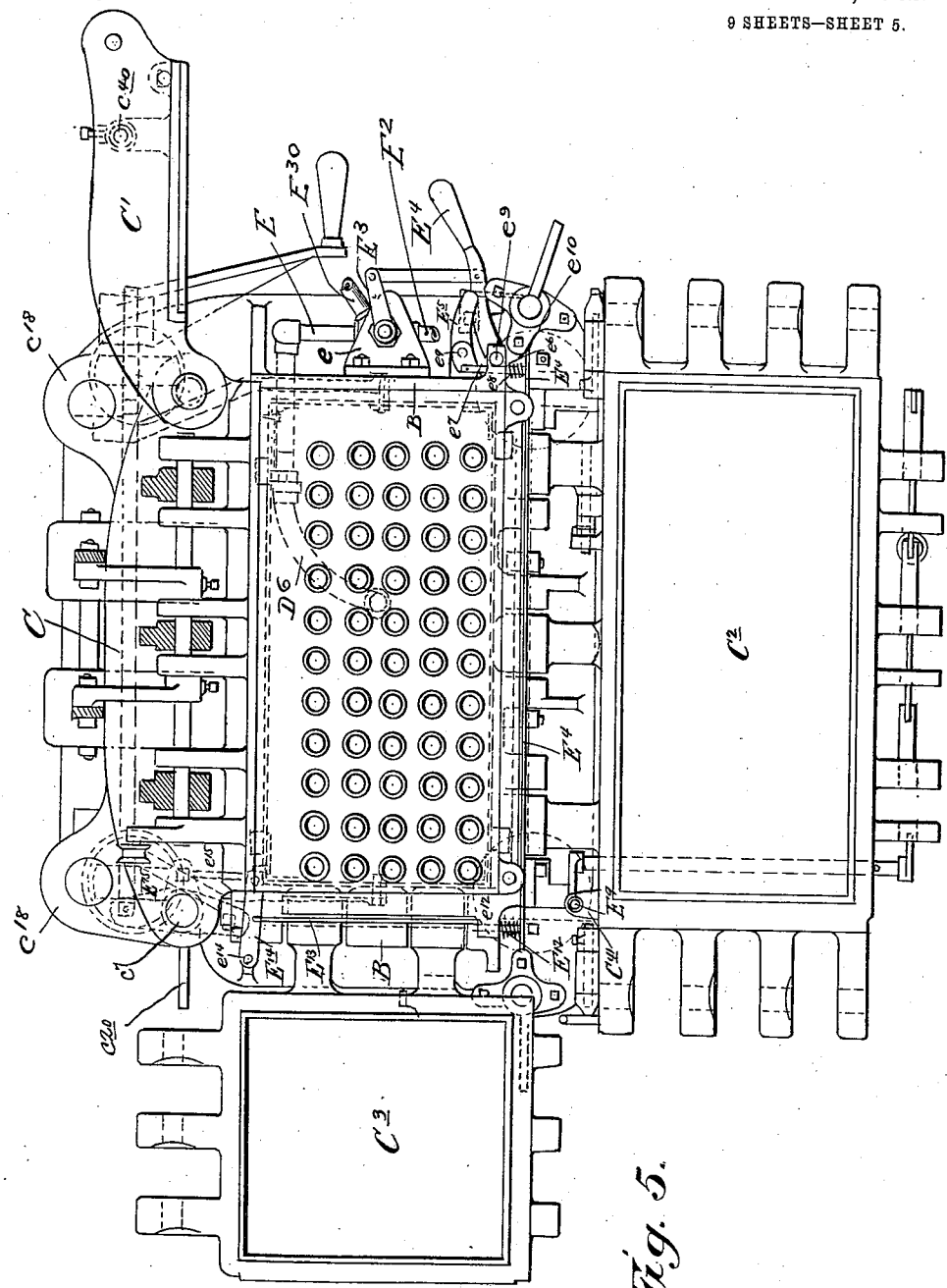
Figure 6:
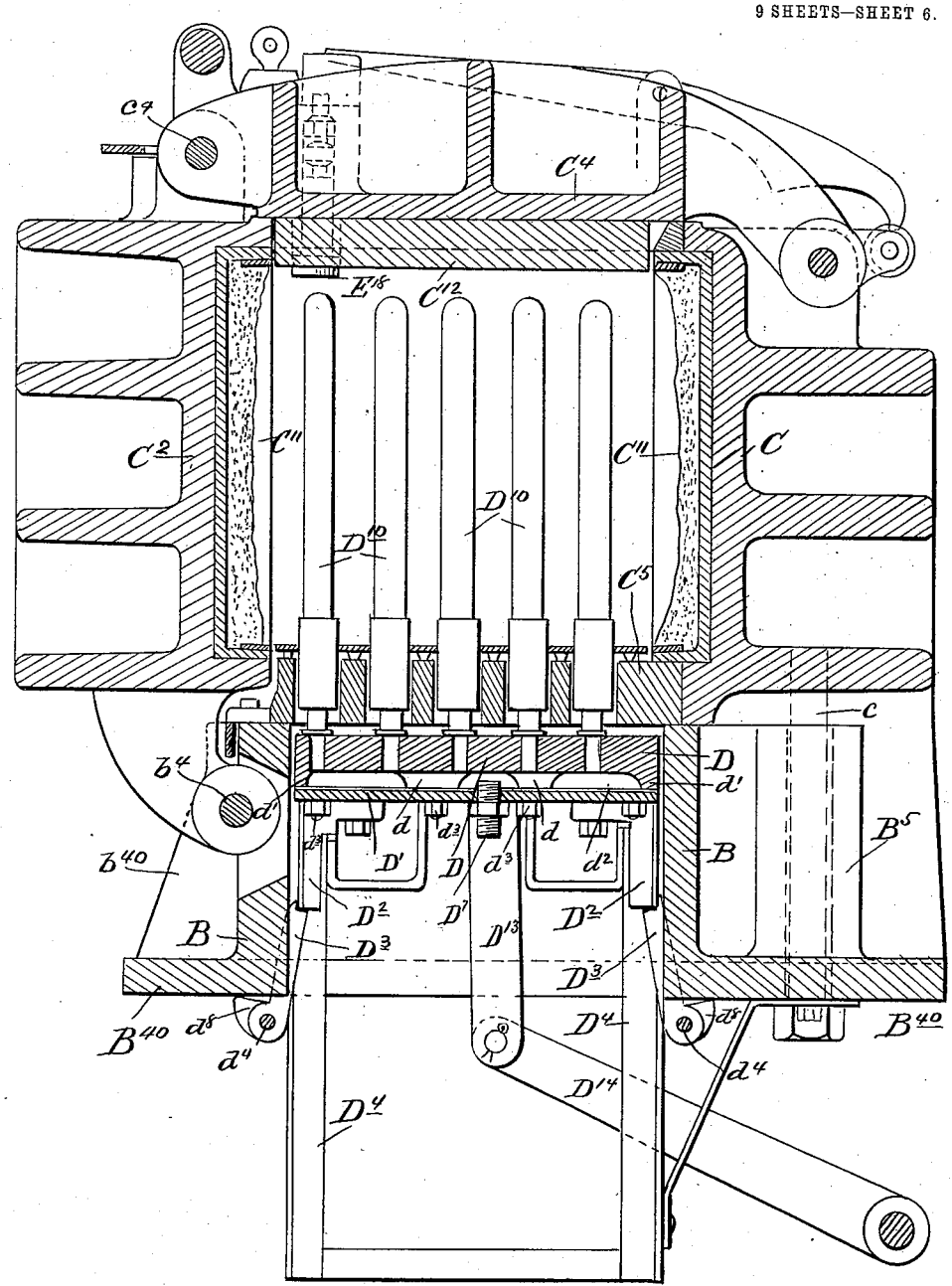
Figure 7:
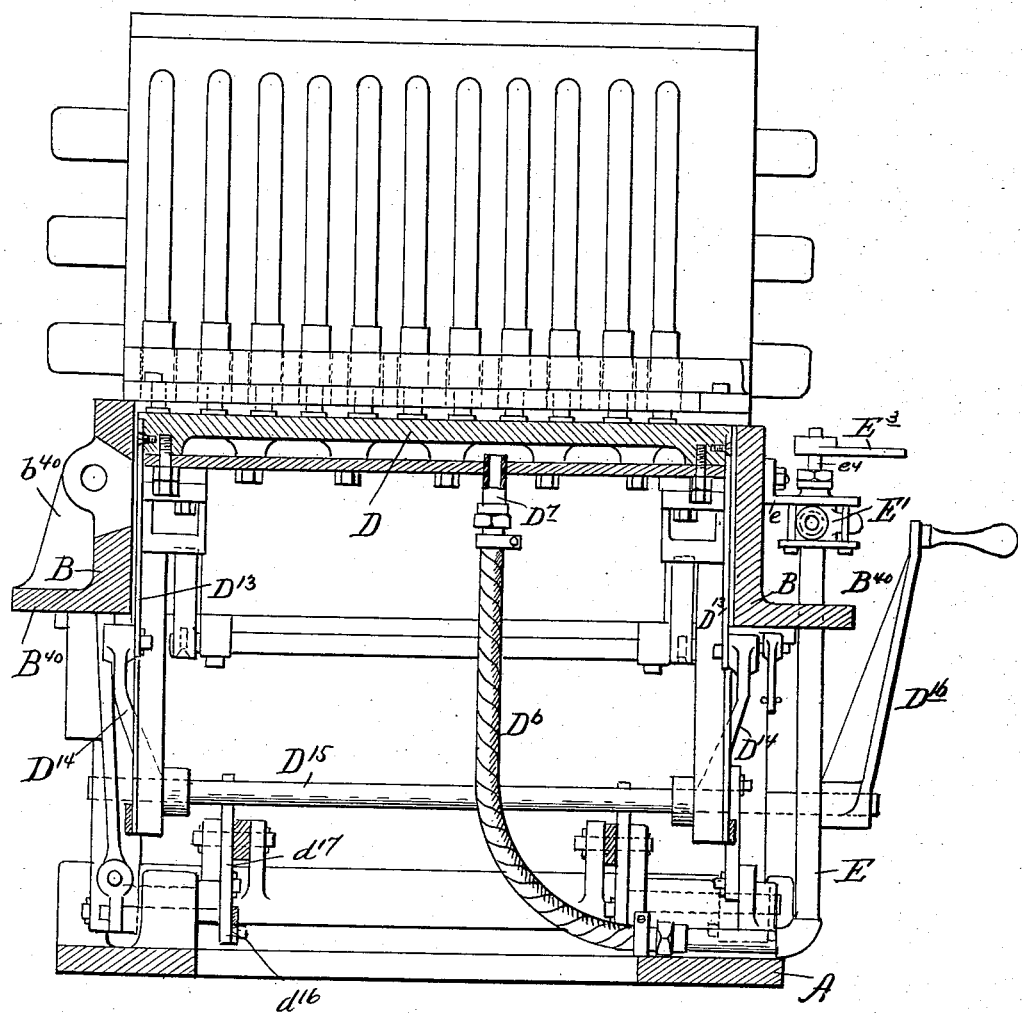

Referring to the accompanying drawings which are made a part hereof and on which similar reference characters indicate similar parts, Figure 1 is a top or plan view of a molding machine of my improved construction, Fig. 2 an end elevation thereof as seen when looking in the direction indicated by the arrows from the dotted line 2—2 in Fig. 1, Fig. 3 a front elevation, Fig. 4 an end elevation as seen when looking in the direction indicated by the arrows from the dotted line 4—4 in Fig. 1, Fig. 5 a top or plan view of the press with its top and sides open as when a block has just been removed therefrom, Fig. 6 a transverse vertical section on the dotted line 6—6 in Fig. 1, Fig. 7 a longitudinal vertical section on the dotted line 7—7 in Fig. 1, with the hinged sides of the mold omitted, Fig. 8 a detail sectional view of one of the expansible or flexible thimbles for applying the hydraulic pressure and the parts with which it is connected, on an enlarged scale, Fig. 9 a detail sectional view through the valve for controlling the fluid pressure, Figs. 10, 11 and 12 detail views showing parts of the mechanism more clearly, and Fig. 13 a view showing a modified form of expansible thimble.

In said drawings the portions marked A represent the base or stand upon which the machine is mounted, B the main supporting frame of the press or mold proper, C, C', $C^2$ and $C^3$ the four vertical sides of the mold or press, $C^4$ the top thereof, $C^5$ the bottom of said mold and D a hollow adjustable table carrying the fluid pressure apparatus.

The main base or stand A is a casting of suitable size and strength to support the machine and has the several standards and brackets formed or mounted thereon to afford the required bearings and connections with the several parts connected therewith.

The frame B is a heavy rectangular casting, having straight vertical interior sides and provided with a horizontal flange $B^{40}$ around its outside at its base and brace webs $b^{40}$ cast at intervals between said flange and the vertical sides of said frame as shown, to afford the strength required to carry the several parts of the mold, which are hinged thereto. Said frame is provided with a leg B' at each rear corner which is pivoted at its lower end by means of a pivot bolt $b$ to the outer end of a short crank-arm $b'$. Said crank-arms are secured on a shaft $B^2$ journaled in suitable bearings in brackets A' cast on the top of the rear corners of the base A. On its front corners similar legs $B^3$ are provided, which are pivoted at their lower ends by pivots $b^2$ to the outer end of crank-arms $b^3$ which are secured on a shaft $B^4$, mounted in suitable bearings in standards $A^2$ cast upon the front corners of said base A. It will thus be seen that said frame B is adapted to be raised and lowered through its connection with said shafts $B^2$ and $B^4$ and the means for raising and lowering it, through the balancing of the hinged sides of the mold therewith, will be presently described.

The rear side C of the mold is mounted upon the top edge of the frame or base B, being secured in position by bolts $c$ which pass through heavy flanges cast therewith and through standards $B^5$ cast upon the horizontal flange $B^{40}$ of the frame B. The side $C'$ is hinged to the side C by means of an upright hinge-rod or pintle $c'$ which passes through perforations in inter-engaging hinge projections cast upon the adjacent edges of said parts C and $C'$. The front side $C^2$ of said mold is hinged to the front upper edge of the frame B on a horizontal shaft $b^4$ mounted in bearings in suitable supporting lugs or brackets $b^5$ cast upon the front of said frame and extending through perforations in downwardly projecting arms $c^2$ cast upon the lower edge of said front section. The other end $C^3$ of the mold is mounted upon a horizontal shaft $b^6$ mounted in suitable bearings formed in brackets or standards $b^7$ cast upon the end of frame B and extending through perforations in downwardly projecting arms $c^3$ cast upon the lower edge of said section $C^3$. The top or lid $C^4$ of the mold is hinged to the upper edge of the rear stationary section C on a hinge-rod $c^4$ which extends through inter-engaging hinge parts cast upon the adjacent edges of said parts C and $C^4$. When the several sides of the mold are in closed position the parts $C'$ and $C^2$ are locked together at the front corners by a sliding locking pin $c^5$ which projects through perforations in inter-engaging projections or fingers on the corners of said parts. The parts $C^2$ and $C^3$ are similarly locked together by a sliding locking pin $c^6$ and the opposite edge of the end $C^3$ is similarly locked to the end of the stationary section C by a sliding locking pin $c^7$. The top section $C^4$ is locked to the top edge of the section $C^2$ by means of a series of sliding pins $c^8$ which are mounted upon a bar $C^5$ and adapted to slide in bearings in standards $c^9$ on the top edge of said section $C^2$ and engage through perforations in over-hanging arms $c^{10}$ on the front edge of said lid and also project through other standards $c^{11}$ on the top edge of said section $C^2$ adjacent to the standards $c^9$. Said bar $C^5$ is provided with a handle $c^{12}$, by which it may be conveniently slid back and forth to lock and unlock said lid and short standards $c^{13}$ are cast on the top of the edge of section $C^2$ of a height to afford a suitable rest for said bar $C^5$ to slide upon. A handle bar $C^6$ is formed across the top front edge of said section $C^4$, by which it may be conveniently raised or lowered and it is provided with counter-balancing weights $C^7$, which are mounted upon the outer end of arms $C^8$ pivoted on pivot bolts $c^{14}$ to lugs cast near the rear edge of the top of said section $C^4$. Brace rods $c^{15}$ extend from the pivot rod $c^4$ and are connected by pivot bolts $c^{16}$ to said arms $C^8$ back from said pivot and support said weights in position to substantially counter-balance the section $C^4$ on its pivot. The end section $C'$ is provided with a support $c^{17}$ near its front edge, the lower end of which is adapted to rest upon a lug $b^7$ cast upon the side of the frame B, which is adapted to support the front portion of said section at the proper elevation, when in closed position. Lugs $c^{18}$ are cast upon the rear side of the stationary section C being provided with vertical perforations in which the post of a derrick (not shown) may be mounted for convenience in handling the material and finished product. Section $C^2$ is partially supported in closed position by pawls $C^9$, pivoted at their upper ends in lugs on its under edge and adapted to engage at their opposite ends on the edge of the flange on frame B. The locking pins $c^5$, $c^6$ and $c^7$ are each adapted to slide vertically. Pin $c^5$ is provided with a handle $c^{19}$, pin $c^6$ with a handle $c^{20}$ and $c^7$ with a handle $c^{21}$. Each of said handles is preferably a rod or bar of the form best shown in Fig. 3, secured at its lower end to the lower end of the locking pin to which each belongs and being bent outwardly and extending upwardly alongside of said pin and then formed with a horizontal top for a convenient handle. Each of said pins is adapted to drop into a casing $C^{10}$, one of which is secured on the frame B immediately beneath each of said pins and is formed with a slot in one side to receive the projecting handle of the pin, when the mold is to be opened and the pins not in use for locking the sides of the mold together, as will be presently described. Locking pin $c^5$ is supported in elevated position by means of an offset at the top of the slot in its casing $C^{10}$, with which the handle $c^{19}$ is turned to engage, after being elevated. Locking pin $c^6$ is held in elevated position by means of a hook $c^{22}$ set into the underside of part $C^2$ in appropriate position, with which the lower end of said handle is adapted to engage when turned slightly after said pin is elevated. Locking pin $c^7$ is held in elevated position by a similar hook $c^{23}$ depending from the lower edge of section C in appropriate position, with which a cam-shaped sleeve $c^{24}$ on the lower end of locking pin $c^7$ may be turned to engage after said locking pin has been elevated. See Figs. 4 and 12.

Matrices $C^{11}$, as shown in Fig. 6, of any appropriate form may be fixed in the sides of the mold, to give the product the desired shape or character of face and may be fixed in one or more sides according to which side or sides of the product a face other than a smooth face is desired to be given, as will be readily understood. A block or fill-piece $C^{12}$ is mounted on the underside of the top section $C^4$ to project into the mold proper, so that the top face of the product will be on a line with the corners formed by the matrices in the side sections.

The fluid pressure table D is a heavy plate having suitable perforations and seats for the pressure thimbles and having lugs $d$ on its underside supporting a bottom plate D' at a distance therefrom, the joint between said bottom plate and a flange $d'$ depending from the outer edge of said plate D, being tight to prevent leakage by means of a gasket $d^2$ placed between them. A series of clamping bolts $d^3$ secures the parts together. Downwardly extending brackets $D^2$ are secured at each corner of said table, the lower ends of which engage with pivoted pawls $D^3$, which are mounted on suitable pivot rods $d^4$ in brackets on the underside of frame B and on each side of the machine. Upright angle bars $D^4$ are secured in each corner of the opening in frame B and form a guide or way in which said table D is adapted to slide up and down. A gravity lever $D^5$ is pivoted to one of the front legs $B^3$ of the frame B on a pivot $d^5$ formed with a transverse arm on each side of its pivot, the upper end whereof is connected by a link $d^6$ to the lower end of one of the pawls $D^3$, while its lower end is connected by a link $d^7$ to the lower end of pawl $D^3$ on the opposite side of the machine. The weight of the handle of lever $D^5$ will automatically keep said pawls $D^3$ thrown into the path of the supporting brackets $D^2$ on the underside of table D in position to engage with their lower ends as soon as the table has been elevated sufficiently so that said ends will clear the top or engaging faces of said pawls. Rearwardly extending wings $d^8$ are cast on the back of said pawls $D^3$ and are adapted to contact with the underside of frame B and limit their forward motion at the point desired. Said table D is connected by means of a pipe $D^6$ with a fluid pressure supply, said pipe being connected with a fluid-pressure supply, at one end and with a nozzle $D^7$ at the other which extends through the lower plate D' and is adapted to discharge into the hollow space between said plates. It carries the several fluid pressure thimbles, each of which is mounted in a screw-threaded perforation in said plate. The construction of each of said thimbles is best illustrated in Fig. 8 and they each consist of a base $D^8$ formed screw-threaded at its lower end and adapted to screw into one of the perforations in said plate D. It is formed with a squared or rectangular portion $d^9$ adapted to receive a wrench by which the same may be firmly seated. A gasket $d^{10}$ is mounted between the upper end of said perforation and a flange or shoulder on said base $D^8$, thus insuring a tight joint. Said base $D^8$ is hollow and a rod $D^9$ passes therethrough, the lower end of said rod being stepped into a suitable socket $d^{11}$ in the plate D' beneath and its upper end being armed with a ball or oval shaped part $d^{12}$ as shown. A collar $d^{13}$ is mounted on said rod at a point just above the curing plate and a rubber thimble $D^{10}$ is mounted thereon, its upper end resting upon the ball $d^{12}$ and its lower end being secured around a neck $d^{14}$ near the upper end of base $D^8$, by a cord, wire, or any kind of binding material $d^{15}$. A sleeve $D^{11}$ is mounted around the lower end of said rubber thimble $D^{10}$ extending from the upper surface of the plate D to a point just above the collar $d^{13}$, thus insuring that the lower end of the opening formed by the expansion of the rubber thimbles in the process of compressing the concrete will be of a uniform diameter. The inner edge of the upper end of said sleeve $D^{11}$ is curved or tapered as shown, in order to prevent the cutting of the rubber during its expansion over said edge when in use, as will be presently described. The description of the construction of one of said thimbles is the description of all, as each is a duplicate of the other. They may be arranged in any manner desired in said table D, the arrangements for the square block being indicated in Fig. 5. When a block of another form, such as a T-block, an L-block or any of the other various forms, is to be made, the pressure thimbles may be arranged to suit the shape of the block and the vacant perforations in the plate D will be closed by a screw plug $D^{12}$ which will screw down the top of the gasket $d^{10}$ and close the opening against the fluid pressure. In Fig. 8 this thimble is illustrated as an elastic thimble, but any sack or thimble capable of being expanded by inflation will serve the purpose. Thus a non-elastic collapsible sack $d^{20}$, such as shown in Fig. 13, of a size to permit the fluid pressure introduced within it to follow up the compressible lines in the mass of mixture will accomplish the same result and in the same manner as the elastic thimble and be the equivalent thereof for the purposes of this invention.

The curing plate $C^{60}$ will be formed with holes to suit the form of block to be made.

The table D has downwardly extending arms $D^{13}$ pivoted to each end thereof and the lower ends of said arms $D^{13}$ are pivoted to the inner ends of arms $D^{14}$ which are mounted upon and adapted to turn with a rock-shaft $D^{15}$, which is journaled in suitable bearings in the rear legs B' on the frame B. A crank $D^{16}$ is mounted on one of the ends of said shaft $D^{15}$. A link $D^{17}$ is pivoted to the arms $D^{14}$ near the shaft $D^{15}$ and at its lower end is pivoted to the outer end of a crank arm $D^{18}$ on an oscillating shaft $D^{19}$, journaled in suitable bearings in a standard $B^{10}$ on the base A. The opposite end of shaft $D^{19}$ has a short crank $d^{16}$ on which is mounted a pawl $d^{17}$ adapted to engage with a crank pin $d^{18}$ in the upper end of a double crank arm $B^{11}$ on the top side of rock shaft $B^2$. The construction and arrangement at each end of the machine are the same and each of said double crank arms $B^{11}$ is connected by a link $B^{12}$ with similar double crank arms $B^{13}$ on the top side of rock shaft $B^4$ on the opposite side of the machine. By this means any motion imparted to shaft $B^2$ will also be imparted to shaft $B^4$ and the frame B and parts carried thereby, thus raised or lowered evenly on both sides of the machine.

The arrangements for counter-balancing the hinged sections $C^2$ and $C^3$ of the mold will now be described, inasmuch as the mechanism coöperates with the mechanism for counter-balancing the table D and the parts carried thereby.

Lever $C^{30}$ is pivoted on a pivot $c^{30}$ to the underside of hinge section $C^2$ and at its lower ends is connected by a pivot $c^{31}$ to crank arm $C^{31}$ on a short crank shaft $C^{32}$ mounted in bearings in a standard $c^{32}$ on the top of base A at its front corners. On the opposite end of said shaft $C^{32}$ is a short crank arm $c^{33}$ on which is mounted a pawl $C^{33}$, the engaging end of which is adapted to engage with a crank pin $b^{13}$ in the top of the double crank arm $B^{13}$ on shaft $B^4$. The lower end of said pawl $C^{33}$ is formed as a foot lever by which the foot may be conveniently applied to release the engagements of its front end with said crank-pin. The horizontal shaft $b^6$ upon which the section $C^3$ is hinged is formed with a short crank $b^{20}$ upon one end, having a link $b^{21}$ mounted upon its crank pin, which link is pivoted by a pivot $b^{22}$ to a link $B^{20}$, which in turn, is pivoted on a pivot $b^{23}$ to a short link $b^{24}$ mounted on a crank pin $b^{25}$ on the outer end of a crank arm $B^{21}$ mounted on a short rock shaft $B^{22}$ which is journaled in bearings in a standard $B^{23}$ on base A. Said shaft $B^{22}$ is formed with a short crank $b^{26}$ on its opposite end, having a pawl $B^{24}$ mounted thereon the outer end of which is adapted to engage with a crank pin $b^{27}$ in the upper end of double crank arm $B^{25}$ on the top side of rock shaft $B^2$. Said pawl $B^{24}$ has a toe-piece $b^{28}$ extending downwardly from its lower end and a push bar $B^{25}$ is pivoted thereto and extends to a point in front of the machine when it is bent downwardly forming a convenient handle $b^{29}$ for pushing either by the hand or foot to disengage said pawl $B^{24}$ from the crank pin $b^{27}$ when desired.

The flexible pipe or hose $D^6$ connected with the nipple $D^7$ communicating with the fluid pressure table D is connected at its opposite end with a fluid supply pipe E which runs to and is connected with the outlet of a three-way valve casing $E'$, which is secured on a bracket $e$ bolted to one end of the frame B. Said valve casing has three openings, $e'$, $e^2$, and $e^3$ (see Fig. 9). Opening $e'$ is connected to the inlet or supply pipe $E^2$, $e^2$ with the pipe E, which leads to the bottom of the machine and is preferably supported in suitable brackets on the top of base A, with its other end coupled to pipe $D^6$, and $e^3$ is connected with a discharge pipe $E^{30}$. The valve $E^{31}$ is of a globe construction mounted upon a stem $e^4$ upon which is mounted an operating lever $E^3$. The openings $e^2$ and $e^3$ in the valve casing $E'$ are arranged alongside each other and the valve $E^{31}$ is formed with a by-pass $e^5$, which is adapted to connect the inner ends of said openings $e^2$ and $e^3$ when the valve is in the position shown in Fig. 9. The valve lever $E^3$ is connected by a link $e^6$ which extends through an opening in a bar $E^4$, to an operating lever $E^9$ pivoted at $e^{10}$ and formed with an angle arm $e^{11}$ which is mounted to slide longitudinally in brackets on the front side of frame B. Said bar $E^4$ is connected to several sets of locking mechanism by which it is held from longitudinal movement and thus locks lever $E^3$, except when said bar is freed from said locking devices. Said locking devices are controlled by the operation of the several movable parts of the mold, so that when any of the hinged sides of the fluid pressure table are not closed and secured in position, the bar will be locked and the operator be unable to turn on the fluid pressure through the movement of said lever $E^3$, but when said several parts are all in operative position and locked, then the fluid pressure may be turned on. These several sets of locking mechanism will now be described. A locking pin $e^7$ is mounted to slide in a lug on the end of frame B adjacent to said locking bar $E^4$, its front end being adapted to engage with a notch in said bar and be normally held in engagement therewith by means of a coiled spring $e^8$. Its rear end is connected by a pivot to one end of the lever $E^5$ mounted on a pivot $e^9$ in a bracket on the end of frame B. The rear edge of said lever $E^5$ is curved and on the lower edge of the hinged section $C'$ is mounted an anti-friction roller $c^{40}$ which when said section is closed is adapted to contact with the rear edge of said lever and force it forward, withdrawing the locking pin $e^7$ from its engagement with the locking bar $E^4$. A short rock-shaft $E^6$ is mounted in a bearing formed in a boss $C^{40}$ on the lower edge of the hinged section $C^2$ near its right-hand end. On one end of said rock-shaft is mounted a projecting arm $E^7$ adapted to engage with a notch in the top edge of said bar $E^4$. On the outer end of said rock-shaft is mounted another arm or lever $E^8$, the outer end of which projects across the lower end of the handle $c^{19}$ on the locking pin $c^5$, so that when said handle is raised to its extreme limit and the locking pin $c^5$ secured in place, said handle will contact with said lever $E^8$ and rock the shaft $E^6$ to raise the arm $E^7$ out of engagement with the notch in the top of said locking bar $E^4$. A short arm $e^{10}$ projects from the rear of lever $E^8$ and is adapted to contact with the underside of section $C^2$ to limit the movement of these parts to hold them in proper relative position for engagement when said hinged section $C^2$ is closed. On the opposite end of section $C^2$, a locking pin $E^9$ is mounted to slide transversely in a lug $C^{41}$ being normally adapted to engage a notch or perforation in said locking bar $E^4$ and its outer end is pivoted to a crank arm $E^{10}$ on the lower end of a crank shaft $E^{11}$ mounted in bearings in the flanges on the face of section $C^2$ and having arm $e^{11}$ with a cam-shaped end on its upper end, the cam face of said arm being adapted to normally project into the opening for the locking pin $c^8$ in the bracket $c^{11}$ on the upper edge of said section $C^2$. Thus when said locking pin $e^8$ is forced into position to lock the sections $C^2$ and $C^4$ together, the end of said pin will contact with the cam face of arm $e^{11}$ and allow said shaft $E^{11}$ to withdraw the locking pin $E^9$ from its engagement with said locking bar $E^4$. Another locking pin $E^{12}$ is mounted on the end of frame B to which section $C^3$ is hinged. It is normally held into engagement with a perforation in locking bar $E^4$ by means of a spring $e^{12}$. A link $E^{13}$ connects the rear end of said locking pin with a lever $E^{14}$ mounted on a pivot $e^{14}$ on a suitable bracket on the opposite side of the frame. Said link $E^{13}$ is engaged with said lever $E^{14}$ at a point between said pivot $e^{14}$ and its opposite end and said opposite end is connected by another link $e^{15}$ with an arm $E^{15}$ on a sleeve $c^{24}$ on the lower end of locking pin $c^7$. Said sleeve, as best shown in Fig. 12, is locked, by an internal lip engaging with a vertical groove, to turn with said pin $c^7$, which is adapted to slide through it. Thus when locking pin $c^7$ is raised to position to lock the section $C^3$ to the section C and said pin and sleeve are turned to secure said pin locking pin $E^{12}$ will be withdrawn from the locking bar $E^4$. Midway of said locking bar $E^4$ it is formed with a notch into which one end of the head $e^{16}$ of a T-bolt $E^{16}$ is adapted to engage. The shank of said bolt being mounted in a socket in the top of the edge of the frame B and the opposite end of said head being in the path of the fluid pressure table, whereby as said table is raised to position for operation, said bolt will be lifted until its head is out of engagement with said locking bar and said locking bar will be thus left free to slide and the operator then be enabled, after all parts of the mold are closed and secured, to turn on the fluid pressure. By this arrangement the danger of accident from prematurely turning on said pressure, is obviated.

In order that the fluid pressure may not be turned on until the mold is also filled with concrete, a plunger $E^{18}$ is mounted in a cavity in the front left-hand corner of the plate $C^{12}$ of the top or lid $C^4$ (see Fig. 11) the stem $e^{18}$ of which, projects through said lid to above its top surface. It is formed with an annular groove $e^{19}$ in position to engage with the inner end of a spring latch bolt $E^{19}$ when said plunger is lifted to a position so that its lower end will be in the same plane with the lower surface of said lid. Said latch bolt $E^{19}$ is mounted in a suitable way in the front flange of said lid and upon its outer end has a roller $e^{20}$ adapted to bear against the outer face of the cam lever $e^{11}$ on the top end of rock shaft $E^{11}$. By this means, said rock-shaft $E^{11}$ is locked against the motion necessary to withdraw the locking bolt $E^9$ from engagement with the bar $E^4$ until the plunger $E^{18}$ is raised, so that the bolt $E^{19}$ may be forced into the annular groove $e^{18}$ as before described. Said lid $C^4$ cannot thus be fully locked by the locking pins $c^8$ until the mold is filled with concrete so that the lower end of plunger $E^{18}$ will contact therewith and be raised to the lower surface thereof. When said lid is raised the rear end of a weighted lever $E^{21}$, which is mounted on a pivot $e^{21}$ on a standard $E^{22}$, is adapted to pass over a flanged roller $e^{22}$ on the top of the rear side C and its front end contacts with the upper end of the stem $e^{18}$ and forces the plunger down to the position indicated by dotted lines in Fig. 4, thus guarding against any danger of the plunger being held in elevated position by the concrete packing around its lower end during the process of forming the block.

The operation of the machine will be readily understood from the foregoing description, and may be briefly recapitulated as follows: It being desired to form a block, the sides of the press are closed, and the top left open as indicated in Fig. 4. The concrete mixture is then deposited in the box, rammed down around the sacks or thimbles $D^{10}$, and when filled to the line of the inner face of the top $C^4$, said top is closed, and all parts secured by the several locking mechanisms described. The fluid pressure is then turned on, which in a moment inflates and expands the thimbles $D^{10}$ or sacks and compresses the concrete in all directions outwardly against the inner faces of the mold. The valve is then turned to the position shown in Fig. 9, when the fluid is allowed to escape, the thimbles contracting to expel said fluid. The table D carrying the thimbles is then lowered to drop the thimbles free from the work, the top $C^4$ and the sides $C'$, $C^2$ and $C^3$ are opened and the curing plate $C^{60}$ with the formed block thereon is removed to the place where it is to be cured. A derrick may be mounted on the back of the machine, as before described, for convenience in handling both the concrete and the product. Another curing plate is then put in place, the table D raised and locked, the sides closed, the mold filled, the top closed, and the several parts locked, when the operation is repeated.

Instead of the fluid pressure thimbles or sacks being embedded within the mixture such a sack might be placed between one or more faces of the mixture, within its operative faces and corners, and a fixed side of the mold, as will be readily understood.

Having thus fully described my said invention, what I claim as new and desire to secure by Letters Patent, is:—

1. A press for molding compressible substances comprising a base, a body or frame mounted to be vertically movable upon said base, mechanism for moving said frame, a mold on said frame with hinged sides connected with said mechanism for operating the same, and means for securing said sides closed, substantially as set forth.

2. In a press, the combination, of the base, the body or frame of the press proper mounted to be vertically movable upon said base by means of rock shaft and pivoted connections, means for rocking said shafts to raise or lower said frame, and the hinged sides of the mold connected with said mechanism, whereby as said sides are opened or closed, such frame is raised or lowered, substantially as set forth.

3. In a press, the combination, of the base, the frame of the mold supported on said base by means of mechanism which will permit said frame to be moved up and down, the mold proper comprising sides hinged to said frame, part of which are connected with the adjusting mechanism, whereby as they are opened or closed the mold is raised or lowered, the vertically movable fluid pressure table mounted beneath the bottom of said mold and supported upon said mechanisms, and carrying the pressure imparting devices, and means for operating said several parts, substantially as set forth.

4. In a press, the combination, of the base, the mold frame supported thereon by means of rock-shafts having crank arms which are pivoted to the supports of said frame, levers for turning said rock-shafts and raising or lowering said frame, the hinged sides of said mold, a part of which are connected to said operating levers, whereby as they are opened or closed said shafts will be rocked and the mold raised or lowered, the fluid pressure table mounted beneath the bottom of the mold and carrying the pressure imparting devices and also connected with said rock-shafts and adapted to be partially balanced by the weight of the mold, substantially as set forth.

5. In a press, the combination, of the base, the mold frame movably secured upon said base, mechanism for moving said frame, and the movable parts of said press connected with said mechanism, whereby they are partially balanced by the weight of said mold, substantially as set forth.

6. In a molding machine, the combination, of the base, the mold frame movably mounted thereon, the doors to said mold, part of which are mounted on horizontal hinges and connected to operate the mechanism for moving said frame, a fluid pressure table movably mounted within said frame and also connected to said mechanism, expansible thimbles mounted on said fluid pressure table to extend within the mold, a fluid pressure supply pipe connecting with said table, and a valve for controlling the flow of the fluid pressure to said table, substantially as set forth.

7. In a molding machine, the combination of the base, the frame of the mold mounted to be movable in a vertical direction thereon, the doors of said mold, part of which are mounted on horizontal hinges and connected with the mechanism, means for locking said doors in closed position, a fluid pressure table vertically movable, and connected with the means for adjusting the frame, expansible thimbles mounted thereon and adapted to extend within the mold, a fluid pressure supply pipe connected with said fluid pressure table, and a valve for controlling the flow of the fluid under pressure to and from said table, substantially as set forth.

8. In a molding machine, the combination, of the base, the mold frame mounted thereon, the sides of said mold hinged to said frame and adapted to open and close, means for securing said several sides in closed position, a fluid pressure table movably mounted in said frame beneath said mold, a fluid pressure supply pipe connected with said table, and a valve for controlling the fluid pressure, said valve being connected to each of the swinging movable parts of said mold, whereby it is locked from movement until all of said parts are in closed and secured position, substantially as set forth.

9. In a molding machine, the combination, of the base, the mold mounted thereon, having hinged top and sides, a fluid pressure table mounted beneath said mold and having expansible thimbles adapted to extend within said mold, a fluid pressure supply pipe connected with said table, a valve for controlling the fluid under pressure therein, said valve being locked to a part and a connection running from said part to each of the swinging sides of said mold and to said pressure table, whereby when either of said parts is moved from the operative position said part is locked to prevent the movement of said valve, substantially as set forth.

10. In a molding machine, the combination, of the base, the mold mounted thereon, a fluid pressure table mounted beneath said mold and having expansible thimbles adapted to extend within said mold, a fluid pressure supply pipe connected with said table, a valve in said pipe for controlling a fluid pressure, and a locking bar connected with said valve, said locking bar being also connected to each of the movable parts of the mold and to the fluid pressure table by mechanisms which will release said bar only when all of said parts are secured in operative positions, substantially as set forth.

11. In a molding machine, the combination, of the base, the mold frame mounted thereon, the sides of said mold hinged to said frame, the top also hinged to the rear side of said mold, said top being provided with balancing weights mounted upon arms extending beyond its pivot, one of the end doors being mounted upon a vertical pivot and the other side and end being mounted upon horizontal pivots and connected through an intermediate lever and rock-shaft connection with the frame, whereby said several parts are substantially balanced and their operation rendered easy, substantially as set forth.

12. In a molding machine, the combination, of the base, the mold mounted thereon, the sides of said mold hinged to the frame or base thereof, and vertically sliding pintles adapted to engage with the hinge-parts on each section, and cases on the frame arranged to receive said pintles when removed from engagement, as when said sides are to be opened, substantially as set forth.

13. In a molding machine, the combination, of the base, the frame of the molds supported upon arms on one side of the axis, rock-shafts mounted in bearings on said base, the doors of said mold connected with arms on the opposite sides of the axis of said rock-shafts, the movable fluid pressure table also connected with the opposite sides of said rock shafts and the means for moving and securing said several parts, substantially as set forth.

14. In a molding machine, the combination, of the base, the frame of the mold supported thereon, the sides and top of said mold being hinged to said frame, the fluid pressure table mounted beneath said mold and carrying expansible cores adapted to extend within said mold, means for raising and lowering said table to project said expansible cores within the mold and withdraw them therefrom, a fluid pressure pipe connected with said table, a valve for admitting a fluid pressure to within the expansible cores and means for locking said valve against movement when any of the movable parts are out of their operative positions, and for unlocking said valve when all of said parts are in their operative and secured positions, substantially as set forth.

15. In a molding machine, the combination, of a base, a frame supporting the mold, said mold composed of hinged doors and operating parts, rock shafts mounted in bearings in said base, said frame supported upon arms on one side of the axis of said rock-shafts and said hinged doors connected with arms on the opposite sides of said rock-shafts, substantially as set forth.

In witness whereof, I have hereunto set my hand and seal at Washington, D. C., this 28th day of August, A. D. nineteen hundred and six.

FRANK F. LANDIS. [L. S.]

Witnesses:
E. W. BRADFORD,
E. H. PARKINS.

Copies of this patent may be obtained for five cents each, by addressing the "Commissioner of Patents. Washington, D. C."